United States Patent
Iyer et al.

(10) Patent No.: US 11,748,092 B2
(45) Date of Patent: Sep. 5, 2023

(54) INFORMATION HANDLING SYSTEM WITH A SEQUENCED ORDER OF FIRMWARE UPDATES

(71) Applicant: DELL PRODUCTS, LP, Round Rock, TX (US)

(72) Inventors: Pushkala Iyer, Round Rock, TX (US); Santosh Gore, Bangalore (IN); Raveendra Babu Madala, Bangalore (IN); Raajeev Kalyanaraman, Cedar Park, TX (US); Sudhir Shetty, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/230,348

(22) Filed: Apr. 14, 2021

(65) Prior Publication Data

US 2022/0334826 A1 Oct. 20, 2022

(51) Int. Cl.
| | |
|---|---|
| G06F 9/44 | (2018.01) |
| G06F 8/654 | (2018.01) |
| G06F 9/4401 | (2018.01) |
| G06F 8/658 | (2018.01) |
| G06F 8/71 | (2018.01) |

(52) U.S. Cl.
CPC .............. *G06F 8/654* (2018.02); *G06F 8/658* (2018.02); *G06F 8/71* (2013.01); *G06F 9/4411* (2013.01)

(58) Field of Classification Search
CPC . G06F 8/654; G06F 8/658; G06F 8/71; G06F 9/4411
See application file for complete search history.

(56) References Cited

U.S. PATENT DOCUMENTS

| | | | | |
|---|---|---|---|---|
| 7,823,148 | B2* | 10/2010 | Deshpande | G06F 8/65 |
| | | | | 717/172 |
| 9,383,989 | B1* | 7/2016 | Qi | G06F 8/65 |
| 2015/0178063 | A1* | 6/2015 | Narkinsky | G06F 8/658 |
| | | | | 717/168 |
| 2019/0250897 | A1* | 8/2019 | Gore | G06F 8/71 |
| 2020/0210203 | A1 | 7/2020 | Madala et al. | |
| 2020/0409690 | A1* | 12/2020 | Rouland | H04L 9/0637 |
| 2021/0048997 | A1 | 2/2021 | Samuel et al. | |

* cited by examiner

*Primary Examiner* — Hang Pan
(74) *Attorney, Agent, or Firm* — Larson Newman, LLP

(57) ABSTRACT

An information handling system includes a memory, a chassis management controller, and a management controller. The memory stores an update catalog and an update sequence catalog. The chassis management controller determines one or more components to update and provides an update request associated with the components. In response to the reception of the update request, the management controller retrieves the update catalog and the update sequence catalog from the memory and determines whether updates for all the components will be completed successfully. In response to the determination that the updates for all the components will be completed successfully, the management controller provides a list of updates for the chassis management controller to install in the information handling system. Otherwise, the management controller provides a user of the information handling system with a set of pre-requisite component versions to include within the update request.

18 Claims, 4 Drawing Sheets

300

| Components 302 | Update Packages 304 |
|---|---|
| Basic Input/Output System (BIOS) | 8.0.0 → 5.0.0+ → MC 4.0.0 |
| BIOS | 5.0.0 → 4.0.0 → 3.0.0 → 2.0.0 |
| BIOS | 7.0.0 → 2.0.0 |
| Management Controller (MC) | 4.0.0 → 3.0.0 |
| Chassis Management Controller (CMC) | 1.3.0 → 1.2.1 → 1.0.0 |
| I/O Module | 3.0.0 → 1.0.0 → CMC 1.3.0 |

| Component 402 | Update Sequence 404 |
|---|---|
| Basic Input/Output System (BIOS) | <BIOS, 1.0.0, 2.0.0>, <BIOS, 2.0.0, 7.0.0>, <BIOS, 7.0.0, 8.0.0> |

*FIG. 4*

INFORMATION HANDLING SYSTEM WITH A SEQUENCED ORDER OF FIRMWARE UPDATES

FIELD OF THE DISCLOSURE

The present disclosure generally relates to information handling systems, and more particularly relates to a sequenced order of firmware updates.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs, and requirements can vary between different applications. Thus, information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

An information handling system includes a memory that may store an update catalog and an update sequence catalog. A chassis management controller may determine one or more components to update and may provide an update request associated with the components. The components may be located within a chassis of the information handling system. In response to the reception of the update request, a management controller may retrieve the update catalog and the update sequence catalog from the memory. The update catalog may be associated with the one or more components. Based on the update catalog and the update sequence catalog, the management controller may determine whether updates for all the components will be completed successfully. In response to the determination that the updates for all the components will be completed successfully, the management controller may provide a list of updates for the chassis management controller to install in the information handling system. In response to the determination that the updates for all the components will not be completed successfully, the management controller may provide a user of the information handling system with a set of pre-requisite component versions to include within the update request.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which:

FIG. 3 is a diagram illustrating an update catalog according to at least one embodiment of the disclosure;

FIG. 4 is a diagram illustrating an update sequence catalog according to at least one embodiment of the disclosure.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Figure 1:
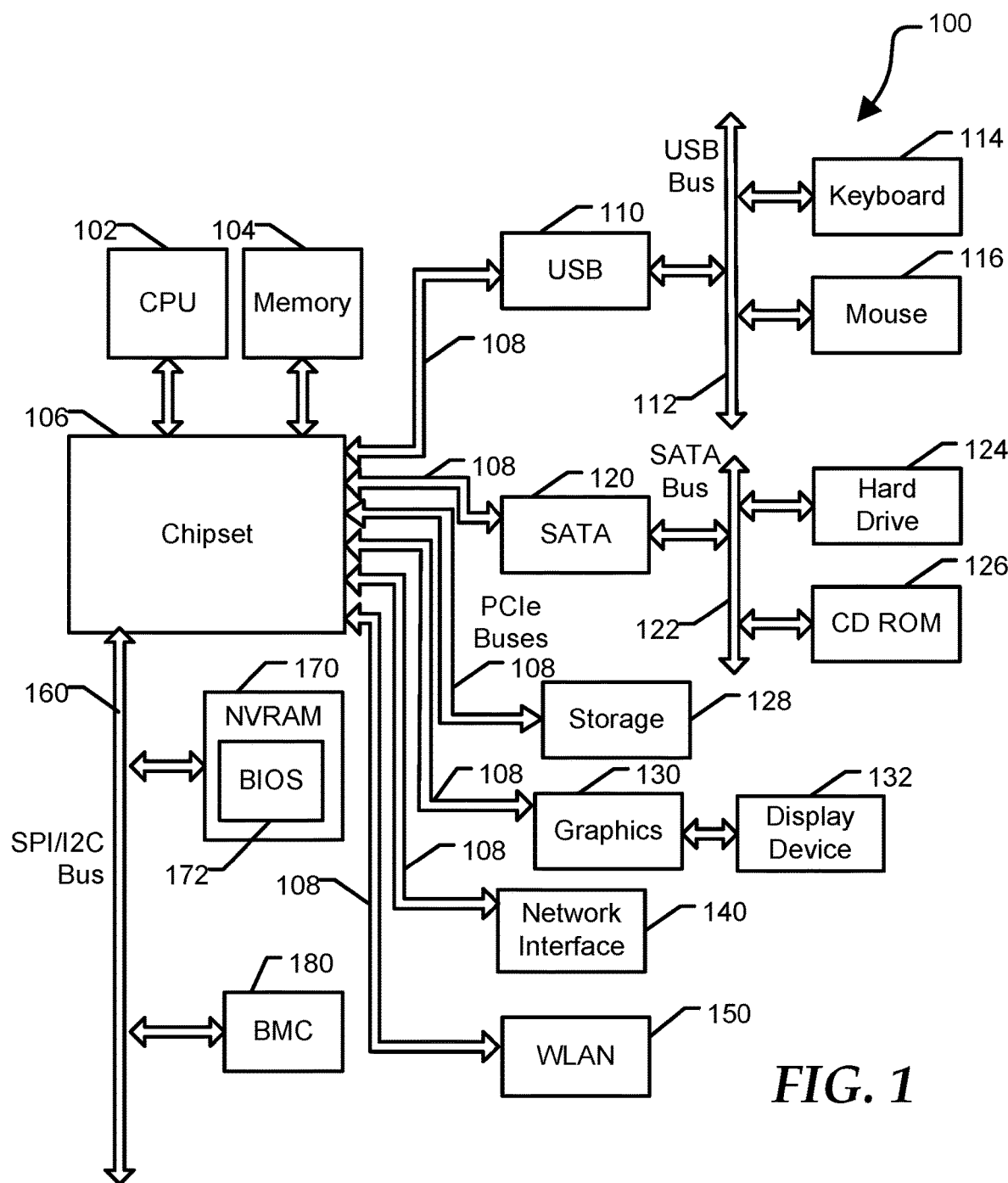
FIG. 1 is a block diagram of a general information handling system according to at least one embodiment of the present disclosure.

FIG. 1 illustrates a general information handling system 100. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network server or storage device, a switch router or other network communication device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various other I/O devices, such as a keyboard, a mouse, and a video display. The information handling system may also include one or more busses operable to transmit communications between the various hardware components.

Information handling system 100 including a processor 102, a memory 104, a chipset 106, one or more PCIe buses 108, a universal serial bus (USB) controller 110, a USB bus 112, a keyboard device controller 114, a mouse device controller 116, a configuration a SATA bus controller 120, a SATA bus 122, a hard drive device controller 124, a compact disk read only memory (CD ROM) device controller 126, a storage 128, a graphics device controller 130, a network interface controller (NIC) 140, a wireless local area network (WLAN) or wireless wide area network (WWAN) controller 150, a serial peripheral interface (SPI) bus 160, a NVRAM 170 for storing BIOS 172, and a baseboard management controller (BMC) 180. In an example, chipset 106 may be directly connected to an individual end point via a PCIe root port within the chipset and a point-to-point topology as shown in FIG. 1. BMC 180 can be referred to as a service processor or embedded controller (EC). Capabilities and functions provided by BMC 180 can vary considerably based on the type of information handling system. For example, the term baseboard management system is often used to describe an embedded processor included at a server, while an embedded controller is more likely to be found in a consumer-level device. As disclosed herein, BMC 180 represents a processing device different from CPU 102, which provides various management functions for information handling system 100. For example, an embedded controller may be responsible for power management, cooling management, and the like. An embedded controller included at a data storage system can be referred to as a storage enclosure processor.

System 100 can include additional processors that are configured to provide localized or specific control functions, such as a battery management controller. Bus 160 can include one or more busses, including a SPI bus, an I2C bus, a system management bus (SMBUS), a power management bus (PMBUS), and the like. BMC 180 can be configured to provide out-of-band access to devices at information handling system 100. As used herein, out-of-band access herein refers to operations performed prior to execution of BIOS 172 by processor 102 to initialize operation of system 100.

BIOS 172 can be referred to as a firmware image, and the term BIOS is herein used interchangeably with the term firmware image, or simply firmware. BIOS 172 includes instructions executable by CPU 102 to initialize and test the hardware components of system 100, and to load a boot loader or an operating system (OS) from a mass storage device. BIOS 172 additionally provides an abstraction layer for the hardware, such as a consistent way for application programs and operating systems to interact with the keyboard, display, and other input/output devices. When power is first applied to information handling system 100, the system begins a sequence of initialization procedures. During the initialization sequence, also referred to as a boot sequence, components of system 100 are configured and enabled for operation, and device drivers can be installed. Device drivers provide an interface through which other components of the system 100 can communicate with a corresponding device.

Information handling system 100 can include additional components and additional busses, not shown for clarity. For example, system 100 can include multiple processor cores, audio devices, and the like. While a particular arrangement of bus technologies and interconnections is illustrated for the purpose of example, one of skill will appreciate that the techniques disclosed herein are applicable to other system architectures. System 100 can include multiple CPUs and redundant bus controllers. One or more components can be integrated together. For example, portions of chipset 106 can be integrated within CPU 102. Additional components of information handling system 100 can include one or more storage devices that can store machine-executable code, one or more communications ports for communicating with external devices, and various input and output (I/O) devices, such as a keyboard, a mouse, and a video display. An example of information handling system 100 includes a multi-tenant chassis system where groups of tenants (users) share a common chassis, and each of the tenants has a unique set of resources assigned to them. The resources can include blade servers of the chassis, input/output (I/O) modules, Peripheral Component Interconnect-Express (PCIe) cards, storage controllers, and the like.

Information handling system 100 can include a set of instructions that can be executed to cause the information handling system to perform any one or more of the methods or computer-based functions disclosed herein. The information handling system 100 may operate as a standalone device or may be connected to other computer systems or peripheral devices, such as by a network.

In a networked deployment, the information handling system 100 may operate in the capacity of a server or as a client user computer in a server-client user network environment, or as a peer computer system in a peer-to-peer (or distributed) network environment. The information handling system 100 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 100 can be implemented using electronic devices that provide voice, video, or data communication. Further, while a single information handling system 100 is illustrated, the term "system" shall also be taken to include any collection of systems or sub-systems that individually or jointly execute a set, or multiple sets, of instructions to perform one or more computer functions.

Figure 2:
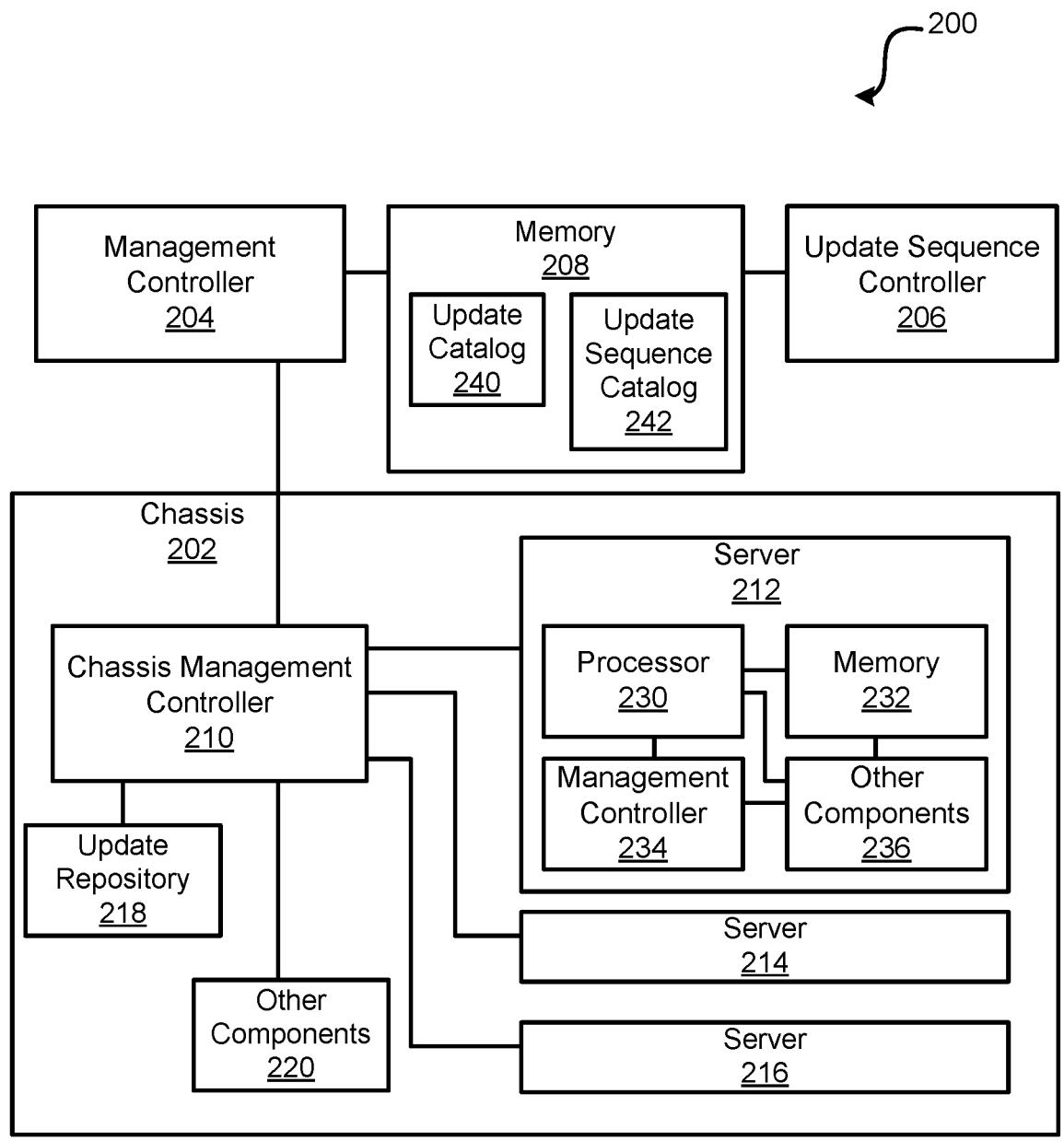
FIG. 2 is a block diagram of a portion of an information handling system according to at least one embodiment of the disclosure.

FIG. 2 illustrates a portion of an information handling system 200 according to at least one embodiment of the disclosure. Information handling system 200 includes a chassis 202, management controller 104, an update sequence controller 206, and a memory 208. Chassis 202 includes a chassis management controller 210, servers 212, 214, and 216, an update repository 218, and other components 220. Servers 212, 214, and 216 may be any suitable devices including, but not limited to, compute nodes and input/output modules (IOMs). Each of the servers 212, 214, and 216 can include multiple components, such as a processor 230, a memory 232, a management controller 234, and other components 236. In an example, other components 220 and 236 may be any suitable components including, but not limited to, the components described with respect to information handling system 100 shown in FIG. 1. Management controller 234 may be any suitable device including, but not limited to, a baseboard management controller. In an example, a baseboard management controller, such as management controller 234, may be provided by an integrated DELL® Remote Access Controller (iDRAC) service module (iSM) available from DELL® Mc. of Round Rock, Tex., United States. As would be understood by one of skill in the art, the iSM available from DELL® Inc. provides a lightweight software service that integrates OS features with the iDRAC available from DELL® Inc., and include functionality such as providing OS information to the iDRAC, adding capabilities such as lifecycle log event replication into the operating system log, WINDOWS® Management Instrumentation (WMI) support (including storage), iDRAC Simple Network Management Protocol (SNMP) alerts via the operating system, iDRAC hard reset and remote full power cycle capabilities, automated report collection processes, and other functionality, while producing relatively little impact on the processing system (and relatively small footprint in the memory system).

Management controller 104 may communicate with memory 108. Chassis management controller 210 may communicate with the catalog repository 208, with the servers 212, 214, and 216, and with the update repository 118. In an example, memory 208 may be utilized to store any suitable data including, but not limited to, an update catalog 240 and an update sequence catalog 242. In certain examples, information handling system 200 may include additional components over those shown in FIG. 2 without varying from the scope of this disclosure.

In an example, management controller 204 may perform one or more operations to manage the devices within information handling system 200 including, but not limited to, chassis 202, servers 212, 214, and 216. For example, management controller 204 may determine or receive firmware updates for chassis management controller 210, servers 212, 214, and 216, one or more of the components of servers 212, 214, and 216, such as processor 230, memory 232, management controller 234, and other components 236. Management controller 204 may publish these firmware updates on a website for access by chassis management controller 210. In an example, memory 208 may be associated with the firmware update website, and management controller 204 may store the updates in update catalog 240. Chassis management controller 210 may access update catalog and download one or more update packages for firmware updates. Chassis management controller 210 may store the update packages to update repository 218 for later update in the chassis management controller and the components of servers 212, 214, and 216.

In certain examples, firmware of components within information handling system 200 may be periodically updated. The periodic firmware may be any suitable amount of time including, but not limited to, six months, and one year. In previous information handling systems, if components are not regularly updated, the updates may not be able to be installed. For example, firmware updates may have intra-component dependencies, inter-component dependencies, or the like. These dependencies may include firmware update pre-requisites or intermediate updates, which if not installed may cause the current component updates will fail. In previous information handling systems intermediate versions of a component update may not be automatically updated. Management controller 204 and update sequence controller 206 may improve information handling system 200 by determining the pre-requisites for the component updates and determining an optimal sequence for all component updates to ensure the component updates may be successfully completed. Information handling system 200 may be further improved by these operations being performed prior to the updates being attempted.

In an example, update catalog 240 and update sequence catalog 242 may include any suitable data to enable component updates. For example, the firmware updates stored within update catalog 240 may include an update package for each component to be updated. In certain examples, each update package may include any suitable data for a respective component firmware update. For example, an update package may include inter-component and intra-component dependencies for the firmware update of the associated component. Update sequence catalog 242 may include context-specific update sequences for component updates. For example, update sequence catalog 242 may include data for attempted update sequences in a specific solution context, such as new dependencies on one or other components, a sequence of updates that were successfully installed, and an amount of time taken for a specific update. In certain examples, the amount of time to perform the specific update may be normalized to any particular download speed including, but not limited to, one Gigabyte per second. In an example, attempted update sequences may be from any other information handling system in communication with update sequence catalog 242.

In certain examples, one or more components within chassis 202 may be selected in any suitable manner. For example, a user may be presented with a list of components capable of being updated. In an example, the list of components may be displayed in a graphical user interface (GUI), such that one or more of the components may be selected for update. The user may utilize the list of components on the GUI to select the components to update, such as BIOS of processor 230, management controller 234, chassis management controller 210, and an IOM component for update in the context of chassis 202. For clarity and brevity, component updates will be described with respect to BIOS of processor 230, management controller 234, chassis management controller 210, and an IOM component.

In response to the selection of BIOS of processor 230, management controller 234, chassis management controller 210, and an IOM component, chassis management controller 210 may perform one or more suitable operations to initiate the update of these components. For example, chassis management controller 210 may determine a current version for each of the selected component. Chassis management controller 210 may provide a component update request to management controller 204. In an example, the component update request may include any suitable data for each component including, but not limited to, the current version of component and the context for the component update.

In an example, management controller 204 may evaluate the current and target end versions for each component based on the component update request, update catalog 240, and update sequence catalog 242. For example, management controller 204 may determine a list of component updates, such as {<BIOS, current, desired>, <management controller, current, target>, <chassis management controller, current, target>, <IOM, current, target>}. In an example, the list of component updates may include the current and desired or end firmware version for the selected components, such as {<BIOS, 1.0.0, 8.0.0>, <Management Controller, 3.0.0, 4.0.0>, <Chassis Management Controller (CMC), 1.0.0, 1.3.0>, <Input/Output Module (TOM), 1.0.0, 3.0.0>}.

Based on the list of component updates, management controller 204 may determine whether any pre-requisites exist for any component. In an example, the pre-requisites may be determined in any suitable manner including, but not limited to, the current version and the desired target version for each component. In certain examples, the update packets stored in update catalog 240 may indicate whether any pre-requisites exist for a component update. In certain examples, if management controller 210 determines that no pre-requisites exist, the chassis management controller 210 may set up a sequence of component updates and execute multiple iterations of the component updates to determine whether the component updates may be successfully completed. In response to the determination that the component updates may be successfully completed, management controller 204 may provide a signal to indicate of firmware versions to be downloaded by chassis management controller 210. Based on the signal, chassis management controller 210 may download and flash stored the indicated firmware versions in update repository 218. Chassis management controller 210 may then perform the components updates based on the firmware versions in update repository 218.

If management controller 204 determines that one or more pre-requisites exist, the management controller may utilize update catalog 240 to determine a component update sequence. Exemplary pre-requisites for components are illustrated in update catalog 300 of FIG. 3.

FIG. 3 illustrates an exemplary update catalog 300 according to at least one embodiment of the disclosure. Update catalog 300 may be substantially the same as update catalog 240 of FIG. 2. Update catalog 300 includes a list of components 302 and update packages 304. Components 302 and update packages 304 will be described with respect to FIGS. 2 and 3. As stated above, update packages 304 may include one or more intra-component and inter-component dependencies. For example, the desired firmware version for BIOS of 8.0.0 associated with processor 230 in sever 212 may have an intra-component dependency of firmware version 5.0.0 or higher and an inter-component dependency of management controller 234 firmware version 4.0.0. Update catalog 300 also may include data indicating BIOS firmware version 5.0.0 may have the follow sequence of intra-component dependencies: firmware version 4.0.0, firmware version 3.0.0, and firmware version 2.0.0. Update catalog 300 may also indicate that BIOS firmware version 7.0.0 may be installed directly from BIOS firmware version 2.0.0.

Update catalog 300 may also indicate intra-component and inter-component dependencies for chassis management controller 210, IOM server 214, and management controller 234. For example, update catalog 300 may indicate that management controller 234 firmware version 4.0.0 has an intra-component dependency of firmware version 3.0.0. Update catalog 300 also may indicate that chassis management controller firmware version 1.3.0 has an intra-component dependency on firmware version 1.2.1. In an example, update catalog 300 may indicate IOM server 3.0.0 has an inter-component dependency of chassis management controller 1.3.0.

In an example, update sequence controller 206 may perform one or more operations to revise update sequence catalog 242. For example, update sequence controller 206 may receive data associated with previous component update attempts and may analyze the data to determine an optimal update sequence. A previous component update attempt may be either a successful update attempt or a failed update attempt. In an example, update sequence controller 206 analyze the attempted sequence, such as the order component updates were installed, the context of the attempted update, and the result of the attempt, such as successful or failure. In response to the analysis of each received attempted component update, update sequence controller 206 may revise update sequence catalog 242 for the context of the attempted update. In an example, the context of the update may include a model of chassis 202, a type of server 212, 214, or 216, or the like.

FIG. 4 illustrates an exemplary update sequence catalog 400 according to at least one embodiment of the disclosure. Update sequence catalog 400 may be substantially the same as update sequence catalog 242 of FIG. 2. Update sequence catalog 400 includes a list of one or more components 402 and one or more update sequences 404. Components 402 and update sequences 404 will be described with respect to FIGS. 2 and 4.

In an example, update sequence catalog 400 may indicate an optimal sequence 404 for a particular component 402. For example, update sequence catalog 400 may indicate that the optimal update sequence for BIOS is <BIOS, 1.0.0, 2.0.0>, <BIOS, 2.0.0, 7.0.0>, and <BIOS, 7.0.0, 8.0.0>. Management controller 204 may utilize update sequence catalog 400 in determining an update sequence for the selected component updates.

In an example, management controller 204 may perform one or more of the operations described above to determine a sequence of component updates to successfully update each component in the list of components to the desired firmware version. As stated above, update catalog 240 may provide update packages for the components, and management controller 204 may determine pre-requisites for each component firmware version. Management controller 204 also may add any optimal pre-requisites to the update list based on update catalog 240.

In the example above, management controller 204 may determine that BIOS 8.0.0 has a dependency on BIOS 5.0.0 or above, and BIOS 7.0.0 may be installed on BIOS 2.0.0. In this situation, management controller 204 may determine the most optimal update path is BIOS 1.0.0→BIOS 2.0.0→BIOS 7.0.0→BIOS 8.0.0. In an example, management controller 204 may utilize any other suitable considerations for determining the optimal update sequence. For example, management controller 204 may examine update sequence catalog 242 to determine if any prior attempt exists. In an example, if there are two paths of the same length for the component updates, management controller 204 may select the sequence path with the shorter time requirement. Based on the analysis of update catalog 240 and update sequence catalog 242, management controller 204 may determine a first sequence for the list of components: {<BIOS, 1.0.0, 2.0.0>, <BIOS, 2.0.0, 7.0.0>, <BIOS, 7.0.0, 8.0.0>, <Management Controller, 3.0.0, 4.0.0>, <CMC, 1.0.0, 1.2.1>, <CMC, 1.2.1, 1.3.0>, <IOM, 1.0.0, 3.0.0>}.

In an example, management controller 204 may determine whether all components for satisfying the pre-requisites of the component update were selected by the user. In response to all component pre-requisites being selected, management controller may proceed with updating the sequence of the component updates. For example, management controller 204 may re-order the list of updates by sequencing component updates that are pre-requisites for other components early in the order of component updates. Based on these operations of management controller 204, the management controller may set the list of component updates as follows: {<Management Controller, 3.0.0, 4.0.0>, <BIOS, 1.0.0, 2.0.0>, <BIOS, 2.0.0, 7.0.0>, <BIOS, 7.0.0, 8.0.0>, <CMC, 1.0.0, 1.2.1>, <CMC, 1.2.1, 1.3.0>, <TOM, 1.0.0, 3.0.0>}.

In response to management controller 204 setting the final sequence for the component updates, the management controller may provide chassis management controller 210 with a list of update packets to download from memory 208 and with an update sequence order. In response, chassis management controller 210 may receive the update packets from update catalog 240 in memory 208 and store the update packets in update repository 218. In an example, management controller 204 may pre-compute the updating of the selected components so the updates may be successfully completed in one attempt.

Chassis management controller 210 and management controller 234 may perform one or more operation to perform the sequenced list of updates in order. For example, chassis management controller 210 may provide management controller 234 with update packages for component within server 212. Management controller 234 store the update packages for components of server 212, such as the BIOS firmware updates and management controller, execute chassis 202 and server, such as servers 212, 214, and 216, level firmware updates. In an example, chassis management controller 210 may perform the chassis level updates, such as chassis management controller updates and IOM server updates.

In an example, chassis management controller 210 may coordinate the firmware updates based on the sequence order received from management controller 204. For example, based on the sequence list {<Management Controller, 3.0.0, 4.0.0>, <BIOS, 1.0.0, 2.0.0>, <BIOS, 2.0.0, 7.0.0>, <BIOS, 7.0.0, 8.0.0>, <CMC, 1.0.0, 1.2.1>, <CMC, 1.2.1, 1.3.0>, <TOM, 1.0.0, 3.0.0>}, chassis management controller 210 may execute the firmware update for management controller 234 from version 3.0.0 to 4.0.0. Chassis management controller 210 cause management controller 234 to execute the next three firmware updates. For example, management controller 234 may execute the firmware update for BIOS from version 1.0.0 to 2.0.0, then the firmware update for BIOS from version 2.0.0 to 7.0.0, and then the firmware update for BIOS from version 7.0.0 to 8.0.0. Chassis management controller 210 may execute the next three firmware updates. For example, chassis management controller 210 may execute the firmware update for CMC from version 1.0.0 to 1.2.1, and then the firmware update for CMC from version 1.2.1 to 1.3.0. Chassis management controller 210 may execute the firmware update for IOM from version 1.0.0 to 3.0.0. Based on these operations of chassis management controller 210 and management controller 234, all the firmware updates may be successfully performed in one attempt.

In an example, based on the analysis of update catalog 240 and update sequence catalog 242, management controller 204 may determine whether all components for satisfying the pre-requisites of the component updates were selected by the user. In response to not all components for satisfying the pre-requisites of the component updates not being selected by the user, management controller 204 may provide a notification signal to the user. In an example, the notification signal may be utilized to display a message on a device connected to chassis 202. The message may notify the user that one or more components need to be selected to complete the update. For example, if the user did not originally select chassis management controller 210 to be updated, then IOM server 214 may not be updated based on IOM server firmware version 3.0.0 having an inter-component dependency on chassis management controller firmware version 1.3.0. In this example, management controller 204 may notify the user that chassis management controller 210 should be selected for update before all selected components may be successfully updated. In response to user adding chassis management controller 210 to the list of selected components, all components may be successfully updated.

Figure 5:
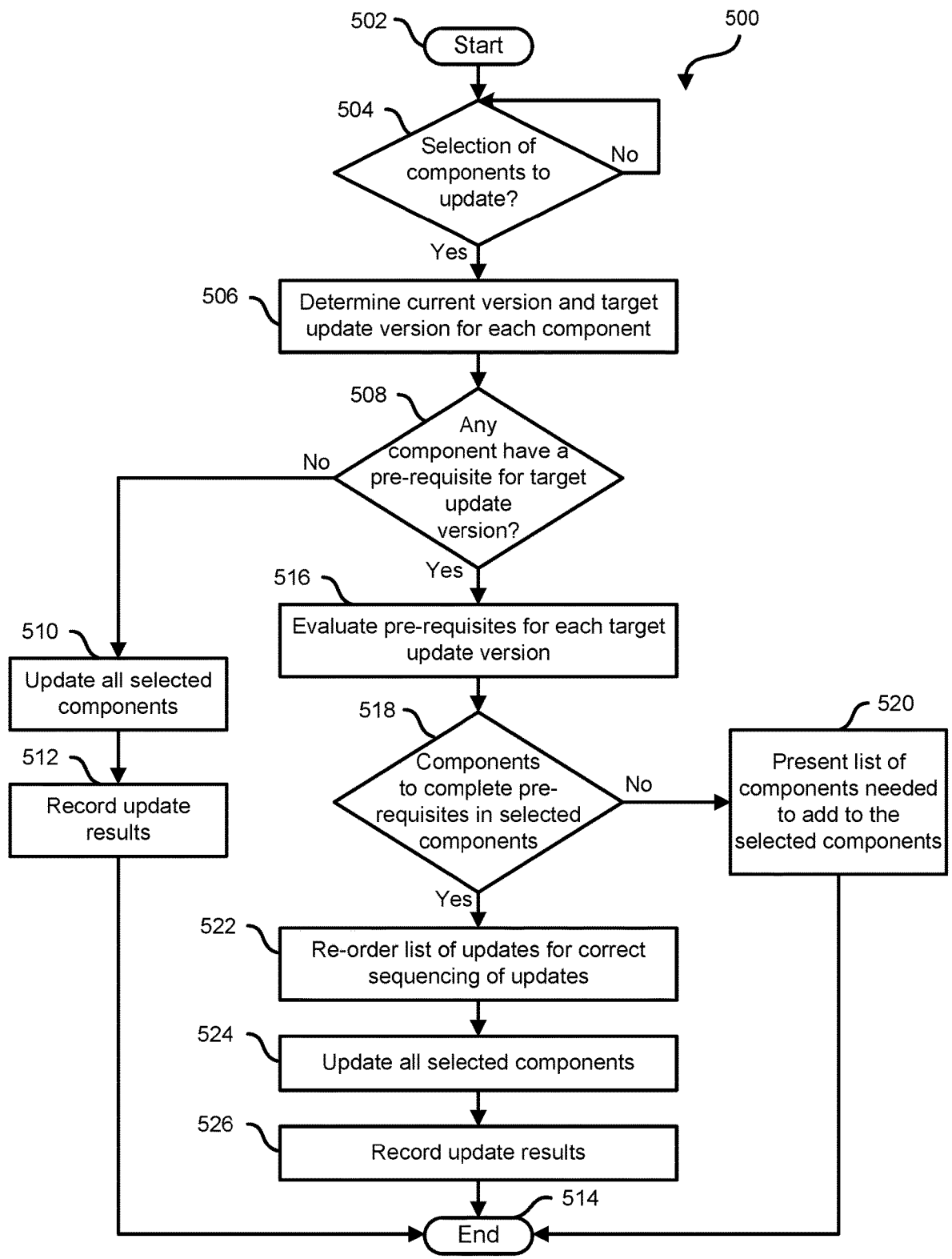
FIG. 5 is a flow diagram of a method for determining pre-requisite updates and an update sequence for component updates according to at least one embodiment of the present disclosure.

FIG. 5 illustrates a flow diagram of a method 500 for determining pre-requisite updates and an update sequence for component updates according to at least one embodiment of the present disclosure, starting at block 502. It will be readily appreciated that not every method step set forth in this flow diagram is always necessary, and that certain steps of the methods may be combined, performed simultaneously, in a different order, or perhaps omitted, without varying from the scope of the disclosure. FIG. 5 may be employed in whole, or in part, by information handling system 100 depicted in FIG. 1, information handling system 200 depicted in FIG. 2, or any other type of system, controller, device, module, processor, or any combination thereof, operable to employ all, or portions of, the method of FIG. 5.

At block 504, a determination is made whether one or more component updates have been selected. In an example, a user may be presented with a list of components capable of being updated. In certain example, the list of components may be displayed in a graphical user interface (GUI), such that one or more of the components may be selected for update. The user may utilize the list of components on the GUI to select the components to update. The components may be any suitable components within a chassis or server of an information handling system. In response to one or more component updates being selected, a current version and a target update version is determined for each selected component at block 506. At block 508, a determination is made whether any component has a pre-requisite firmware update for the target update version of the component.

If no component has a pre-requisite update, all selected components are updated at block 510. In an example, the selected components may be updated in any suitable manner. For example, a chassis management controller within the chassis and a management controller within the server may perform one or more operations to update the selected components. At block 512, update results are recorded and sent to an update sequence controller, and the method ends at block 514. In certain examples, the update results may include any suitable data including, but not limited to, data logs including <start, desired> versions of each component, a sequence of the updates, and an outcome of the attempted update. The outcome may be an indication of either a successful update or update failure of all selected components. In an example, the update sequence controller may utilize the update results to revise a sequence for updates.

In response to one or more of the selected components having one or more pre-requisites, the one or more pre-requisites for each desired target version are evaluated at block 516. In an example, the evaluation of the pre-requisites may include any suitable operations including, but not limited to, adding optimal pre-requisites to the list of component updates, and checking an update sequence catalog. At block 518, a determination is made whether components to complete updates of all pre-requisites are included in the selected components. In response to not of the components for the pre-requisites being in the selected components, providing a list of components to add to the list of selected components at block 520, and the method ends at block 514. In an example, the list of components may be provided to a user of the information handling system in any suitable manner including, but not limited to, displaying a message on a display device of the information handling system.

In response to all components for the pre-requisites being in the selected components, the list of updates is re-ordered to create a correct sequence order of the updates at block 522. At block 524, all selected components are updated. At block 526, update results are recorded and sent to an update sequence controller, and the method ends at block 514.

Referring back to FIG. 1, the information handling system 100 can include a disk drive unit and may include a computer-readable medium, not shown in FIG. 1, in which one or more sets of instructions, such as software, can be embedded. Further, the instructions may embody one or more of the methods or logic as described herein. In a particular embodiment, the instructions may reside completely, or at least partially, within system memory 104 or another memory included at system 100, and/or within the processor 102 during execution by the information handling system 100. The system memory 104 and the processor 102 also may include computer-readable media.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The device or module can include software, including firmware embedded at a processor or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An information handling system comprising:
   a memory to store an update catalog and an update sequence catalog;
   a chassis management controller to determine one or more components to update, and to provide an update request associated with the components, wherein the components are located within a chassis of the information handling system;
   a management controller to communicate with the memory and with the chassis management controller, the management controller to:
   in response to a reception of the update request:
      retrieve the update catalog from the memory, wherein the update catalog is associated with the one or more components; and
      retrieve the update sequence catalog from the memory;
   based on the update catalog and the update sequence catalog, determine whether updates for all the components will be completed successfully, wherein the determination of whether the updates for all the components will be completed successfully includes the management controller further to:
      determine on a component-by-component basis: a current version of each of the components; an update version of each of the components; and whether any intermediate updates exist between the current version and the update version for each of the components;
   in response to the determination that the updates for all the components will be completed successfully, provide a list of updates for the chassis management controller to install in the information handling system; and
   in response to the determination that the updates for all the components will not be completed successfully, provide the chassis management controller with a signal indicating a set of intermediate updates to include within the update request;
   wherein based on the signal from the management controller, the chassis management controller further to:
      download and store the set of intermediate updates;
      determine a length of updates for multiple update paths;
      in response to first and second update paths having a same length of updates, determine lengths of time to complete the component updates for the first and second update paths;
      select the first update path as the order to install component updates, wherein the first update path has the shortest length of time to complete the component updates; and
      perform updates based on the set of intermediate updates.

2. The information handling system of claim 1, wherein the determination of whether the updates for all the components will be completed successfully, the management controller further to:
   in response to no intermediate updates existing for each of the components, determine that the updates for all the components will be completed successfully; and in response to an intermediate update existing for at least one of the components, determine that the updates for all the components will not be completed successfully.

3. The information handling system of claim 1, wherein the management controller further to determine an order to install component updates based on the sequence catalog.

4. The information handling system of claim 1, further comprising:
an update sequence controller to communicate with the memory, the update sequence controller to:
receive, from another information handling system, data associated with a successful component update; and
based on the data associated with the successful component update, update the update sequence catalog in the memory.

5. The information handling system of claim 1, wherein the determination of the order to install component updates, the management controller further to:
setup a plurality of update paths for the component updates;
execute each of the update paths; and
select one of the update paths that has been executed without failure.

6. The information handling system of claim 1, wherein the update catalog includes details identifying intra-component dependencies and inter-component dependencies for each component update.

7. The information handling system of claim 1, wherein the update sequence catalog includes a sequence of updates that has been successfully installed in other information handling systems.

8. A method comprising:
receiving, at a management controller, an update request for one or more components within an information handling system;
in response to receiving the update request:
retrieving an update catalog from a memory, wherein the update catalog is associated with the one or more components; and
retrieving an update sequence catalog from the memory;
based on the update catalog and the update sequence catalog, determining whether updates for all the components will be completed successfully, wherein the determining of whether the updates for all the components will be completed successfully includes:
determining on a component-by-component basis: a current version of each of the components; an update version of each of the components; and whether any intermediate updates exist between the current version and the update version for each of the components;
in response to determining that the updates for all the components will be completed successfully, providing a list of updates for a chassis management controller to install in the information handling system;
in response to determining that the updates for all the components will not be completed successfully, providing a chassis management controller with a signal indicating a set of intermediate updates to include within the update request; and
based on the signal from the management controller:
downloading, by the chassis management controller, the set of intermediate updates;
storing the set of intermediate updates;
determining a length of updates for multiple update paths;
in response to first and second update paths having a same length of updates, determining lengths of time to complete the component updates for the first and second update paths;
selecting the first update path as the order to install component updates, wherein the first update path has the shortest length of time to complete the component updates; and
performing, by the chassis management controller, updates based on the set of intermediate updates.

9. The method of claim 8, wherein the determining of whether the updates for all the components will be completed successfully further comprises:
in response to no intermediate updates existing for each of the components, determining that the updates for all the components will be completed successfully; and
in response to an intermediate update existing for at least one of the components, determining that the updates for all the components will not be completed successfully.

10. The method of claim 8, further comprising:
determining an order to install component updates based on the sequence catalog.

11. The method of claim 8, further comprising:
receiving, from another information handling system, data associated with a successful component update; and
based on the data associated with the successful component update, updating the update sequence catalog in the memory.

12. The method of claim 8, wherein the determining of the order to install component updates further comprises:
setting, by the management controller, up a plurality of update paths for the component updates;
executing, by the management controller, each of the update paths; and
selecting, by the management controller, one of the update paths that has been executed without failure.

13. The method of claim 8, wherein the update catalog includes details identifying intra-component dependencies and inter-component dependencies for each component update.

14. The method of claim 8, wherein the update sequence catalog includes a sequence of updates that has been successfully installed in other information handling systems.

15. An information handling system comprising:
a memory to store an update catalog and an update sequence catalog;
a chassis management controller to determine a component to update, and to provide an update request associated with the component, wherein the component is located within a chassis of an information handling system;
a management controller to:
in response to a reception of the update request:
retrieve the update catalog from the memory, wherein the update catalog is associated with the component; and
retrieve the update sequence catalog from the memory;
based on the update catalog and the update sequence catalog:
determine on a component-by-component basis: a current version of each of the components; an update version of each of the components; and whether any intermediate updates exist for each of the components;

in response to no intermediate updates existing for each of the components, determine that the updates for all the components will be completed successfully; and in response to an intermediate update existing for at least one of the components, determine that the updates for all the components will not be completed successfully;

if the updates for the component will be completed successfully, then determine an order to install component updates based on the sequence catalog and provide a list of updates for the chassis management controller to install in the information handling system; and if the updates for the component will not be completed successfully, then the chassis management controller with a signal indicating a set of intermediate updates to include within the update request;

wherein based on the signal from the management controller, the chassis management controller further to:

download and store the set of intermediate updates;

determine a length of updates for multiple update paths;

in response to first and second update paths having a same length of updates, determine lengths of time to complete the component updates for the first and second update paths;

select the first update path as the order to install component updates, wherein the first update path has the shortest length of time to complete the component updates; and perform updates based on the set of intermediate updates.

16. The information handling system of claim 15, further comprising:

an update sequence controller to communicate with the memory, the update sequence controller to:

receive, from another information handling system, data associated with a successful component update; and based on the data associated with the successful component update, update the update sequence catalog in the memory.

17. The information handling system of claim 15, wherein the determination of the order to install component updates, the management controller further to:

setup a plurality of update paths for the component updates;

execute each of the update paths; and select one of the update paths that has been executed without failure.

18. The information handling system of claim 15, wherein the update catalog includes details identifying intra-component dependencies and inter-component dependencies for each component update.

* * * * *